US009496581B2

(12) United States Patent
Pytlik et al.

(10) Patent No.: US 9,496,581 B2
(45) Date of Patent: *Nov. 15, 2016

(54) BUTTON CELLS AND METHOD OF PRODUCING SAME

(71) Applicant: VARTA Microbattery GmbH, Ellwangen (DE)

(72) Inventors: Eduard Pytlik, Ellwangen (DE); Jürgen Lindner, Ellwangen (DE); Ulrich Barenthin, Ellwangen (DE); Winfried Gaugler, Ellwangen (DE)

(73) Assignee: Varta Microbattery GmbH (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/827,387

(22) Filed: Aug. 17, 2015

(65) Prior Publication Data

US 2015/0372339 A1 Dec. 24, 2015

Related U.S. Application Data

(62) Division of application No. 13/146,669, filed as application No. PCT/EP2010/000787 on Feb. 9, 2010, now Pat. No. 9,153,835.

(30) Foreign Application Priority Data

Feb. 9, 2009 (DE) .......... 10 2009 008 859
Jun. 18, 2009 (DE) .......... 10 2009 030 359
Dec. 22, 2009 (DE) .......... 10 2009 060 788

(51) Int. Cl.
*H01M 4/00* (2006.01)
*H01M 6/10* (2006.01)
(Continued)

(52) U.S. Cl.
CPC ....... *H01M 10/0431* (2013.01); *H01M 2/0222* (2013.01); *H01M 6/10* (2013.01);
(Continued)

(58) Field of Classification Search
CPC .. H01M 2/0222; H01M 2/0207; H01M 4/70; H01M 4/76
USPC .......................... 429/94, 162, 164, 171, 172
See application file for complete search history.

(56) References Cited

U.S. PATENT DOCUMENTS 3,960,599 A 6/1976 Reynier et al.
4,220,695 A 9/1980 Ishida et al.
(Continued)

FOREIGN PATENT DOCUMENTS

CN 201440429 4/2010
DE 1 471 758 A1 5/1969
(Continued)

OTHER PUBLICATIONS

US Official Action dated Aug. 29, 2014 from related U.S. Appl. No. 13/378,117.

*Primary Examiner* — Patrick Ryan
*Assistant Examiner* — Julian Anthony
(74) *Attorney, Agent, or Firm* — DLA Piper LLP (US)

(57) ABSTRACT

A button cell includes a housing cup and a housing top separated from one another by an insulating seal and which form a housing with a flat bottom and a flat top parallel to it, and an electrode-separator assembly within the housing including flat layer positive and negative electrodes and connected to one another by a flat separator, wherein the layers are aligned essentially at right angles to the flat bottom and the flat top and the electrode-separator assembly is a spiral winding having end faces defining side surfaces of the spiral winding facing in an axial direction relative to the flat bottom and the flat top, and one of the electrodes connects to the flat bottom or the flat top via an output conductor including a thin film resting flat between an end face of the spiral winding and the flat top or the flat bottom.

13 Claims, 3 Drawing Sheets

(51) Int. Cl.
*H01M 6/12* (2006.01)
*H01M 6/46* (2006.01)
*H01M 2/02* (2006.01)
*H01M 6/08* (2006.01)
*H01M 10/04* (2006.01)
*H01M 10/05* (2010.01)
*H01M 10/24* (2006.01)
*H01M 10/34* (2006.01)

(52) U.S. Cl.
CPC ......... *H01M10/0427* (2013.01); *H01M 10/05* (2013.01); *H01M 10/24* (2013.01); *H01M 10/34* (2013.01); *Y02E 60/124* (2013.01); *Y02P 70/54* (2015.11); *Y10T 29/4911* (2015.01); *Y10T 29/49108* (2015.01)

(56) References Cited

U.S. PATENT DOCUMENTS

| | | | |
|---|---|---|---|
| 4,224,387 | A | 9/1980 | Nakayama |
| 4,487,819 | A | 12/1984 | Koga |
| 4,927,719 | A | 5/1990 | Ashihara et al. |
| 5,567,538 | A | 10/1996 | Oltman et al. |
| 5,698,340 | A | 12/1997 | Xue et al. |
| 6,066,184 | A | 5/2000 | Brenner |
| 6,143,440 | A | 11/2000 | Volz et al. |
| 6,245,452 | B1 | 6/2001 | Oltman |
| 6,265,100 | B1 | 7/2001 | Saaski et al. |
| 6,443,999 | B1 | 9/2002 | Cantave et al. |
| 7,488,553 | B2 | 2/2009 | Tsukamoto et al. |
| 7,566,515 | B2 | 7/2009 | Suzuki et al. |
| 2001/0009737 | A1 | 7/2001 | Lane |
| 2002/0034680 | A1 | 3/2002 | Inoue et al. |
| 2002/0192559 | A1 | 12/2002 | Yoshimura et al. |
| 2003/0013007 | A1 | 1/2003 | Kaun |
| 2004/0029004 | A1 | 2/2004 | Miyaki |
| 2004/0110061 | A1 | 6/2004 | Haug et al. |
| 2005/0058904 | A1 | 3/2005 | Kano et al. |
| 2005/0181276 | A1 | 8/2005 | Miyaki |
| 2005/0271938 | A1 | 12/2005 | Suzuki et al. |
| 2007/0200101 | A1 | 8/2007 | Asao et al. |
| 2008/0003500 | A1 | 1/2008 | Issaev et al. |
| 2008/0318126 | A1 | 12/2008 | Ishii |
| 2009/0325062 | A1 | 12/2009 | Brenner et al. |
| 2010/0227217 | A1 | 9/2010 | Fujikawa et al. |
| 2011/0091753 | A1 | 4/2011 | Wang et al. |
| 2011/0200871 | A1 | 8/2011 | Pytlik et al. |
| 2012/0015224 | A1 | 1/2012 | Pytlik et al. |
| 2012/0028110 | A1 | 2/2012 | Brenner et al. |
| 2012/0100406 | A1 | 4/2012 | Gaugler |
| 2013/0130066 | A1 | 5/2013 | Pytlik et al. |
| 2013/0216881 | A1 | 8/2013 | Gaugler et al. |

FOREIGN PATENT DOCUMENTS

| | | |
|---|---|---|
| DE | 31 13 309 A1 | 10/1982 |
| DE | 36 38 793 A1 | 5/1988 |
| DE | 196 47 593 A1 | 5/1998 |
| DE | 697 00 312 T2 | 2/2000 |
| DE | 198 57 638 A1 | 6/2000 |
| DE | 10 2009 008 859 A1 | 8/2010 |
| DE | 10 2009 017 514 A1 | 10/2010 |
| DE | 10 2009 017 515 A1 | 10/2010 |
| EP | 0 202 857 B1 | 7/1991 |
| EP | 1 372 209 A1 | 12/2003 |
| EP | 1 808 916 A1 | 7/2007 |
| EP | 1 968 134 A1 | 9/2008 |
| GB | 1088271 A | 10/1967 |
| GB | 2 110 464 | 6/1983 |
| JP | 01-307176 A | 12/1989 |
| JP | H05-121056 | 5/1993 |
| JP | 07-153488 A | 6/1995 |
| JP | 08-293299 | 11/1996 |
| JP | 08-293299 A | 11/1996 |
| JP | 2000-077040 A | 3/2000 |
| JP | 2002-352789 A | 12/2002 |
| JP | 2003-031266 A | 1/2003 |
| JP | 2004-158318 A | 6/2004 |
| JP | 3902330 B2 | 4/2007 |
| JP | 2007-200683 | 8/2007 |
| JP | 2007-294111 A | 11/2007 |
| JP | 2008-251192 A | 10/2008 |
| JP | 2008-262825 A | 10/2008 |
| JP | 2008-262826 A | 10/2008 |
| WO | 2010/089152 A1 | 8/2010 |

BUTTON CELLS AND METHOD OF PRODUCING SAME

RELATED APPLICATIONS

This is a divisional of U.S. Ser. No. 13/146,669, filed Jul. 28, 2011, which is a §371 of International Application No. PCT/EP2010/000787, with an international filing date of Feb. 9, 2010 (WO 2010/089152 A1, published Aug. 12, 2010), which is based on German Patent Application Nos. 10 2009 008 859.8, filed Feb. 9, 2009, 10 2009 030 359.6, filed Jun. 18, 2009, and 10 2009 060 788.9, filed Dec. 22, 2009.

TECHNICAL FIELD

This disclosure relates to button cells comprising two metallic housing half-parts separated from one another by an electrically insulating seal and which form a housing with a flat bottom area and a flat top area parallel to it, as well as within the housing, an electrode-separator assembly comprising at least one positive and at least one negative electrode, which are in the form of flat layers and are connected to one another by at least one flat separator, and to a method of producing such button cells.

BACKGROUND

Button cells normally have a housing consisting of two housing half-parts, a cell cup and a cell top. By way of example, these may be produced from nickel-plated deep-drawn metal sheet as stamped and drawn parts. The cell cup normally has positive polarity, and the housing top negative polarity. The housing may contain widely differing electrochemical systems, for example, zinc/$MnO_2$, primary and secondary lithium systems, or secondary systems such as nickel/cadmium or nickel/metal hydride.

By way of example, rechargeable button cells based on nickel/metal hydride or lithium-ion systems are in widespread use. In the case of lithium-ion button cells, the electrochemically active materials are normally not arranged within the button cell housing in the form of individual electrodes, in the form of tablets, separated from one another by a separator. Instead, prefabricated electrode-separator assemblies are preferably inserted flat into the housing. In that case, a porous plastic film is preferably used as a separator, onto which the electrodes are laminated or adhesively bonded flat. The entire assembly comprising the separator and the electrodes generally have a maximum thickness of a few hundred µm. To allow button cell housings of normal dimensions to be filled, a plurality of such assemblies are therefore frequently placed flat one on top of the other. This allows stacks of any desired height, in principle, to be produced, in each case matched to the available dimensions of the button cell housing into which the stack is intended to be installed. This ensures optimum utilization of the available area within the housing.

By virtue of the design, however, various problems also occur in the case of button cells which contain such stacks of electrode-separator assemblies. On the one hand, it is necessary, of course, for the electrodes of the same polarity each to be connected to one another within the stack, and then each to make contact with the corresponding pole of the button cell housing. The required electrical contacts result in material costs, and the space occupied by them is, furthermore, no longer available for active material. In addition, the production of the electrode stacks is complicated and expensive since faults can easily occur when the assemblies make contact with one another, increasing the scrap rate. On the other hand, it has been found that button cells having a stack of electrodes and separators very quickly start to leak.

Traditionally, button cells have been closed in a liquid-tight manner by beading the edge of the cell cup over the edge of the cell top in conjunction with a plastic ring, which is arranged between the cell cup and the cell top and at the same time acts as a sealing element and for electrical insulation of the cell cup and of the cell top. Button cells such as these are described, for example, in DE 31 13 309.

However, alternatively, it is also possible to manufacture button cells in which the cell cup and the cell top are held together in the axial direction exclusively by a force-fitting connection, and which do not have a beaded-over cup edge. Button cells such as these and methods for their production are described in German Patent Application 10 2009 017 514. Irrespective of the various advantages which button cells such as these without beading may have, they can, however, not be loaded as heavily in the axial direction as comparable button cells with a beaded-over cup edge, in particular with respect to axial mechanical loads which are caused in the interior of the button cell. For example, the electrodes of rechargeable lithium-ion systems are continually subject to volume changes during charging and discharging processes. The axial forces which occur in this case can, of course, lead to leaks more readily in the case of button cells without beading than in the case of button cells with beading.

It could therefore be helpful to provide a button cell in which the problems mentioned above do not occur, or occur only to a greatly reduced extent. In particular, it could be helpful to provide a button cell that is resistant to mechanical loads which occur in the axial direction than conventional button cells, in particular even when they are manufactured as button cells without a beaded-over cup edge.

SUMMARY

We provide a button cell including a housing cup and a housing top separated from one another by an electrically insulating seal and which form a housing with a flat bottom area and a flat top area parallel to it, and an electrode-separator assembly within the housing including at least one positive and at least one negative electrode in the form of flat layers and connected to one another by at least one flat separator, wherein the electrode layers are aligned essentially at right angles to the flat bottom and top areas and the button cell is closed without being beaded over.

We also provide a method of producing the button cell including inserting an electrode-separator assembly with electrodes in the form of a flat layer into the housing such that the electrode layers are aligned essentially at right angles to the flat bottom and top areas, wherein the housing includes a metallic cup part and a metallic top part.

DETAILED DESCRIPTION

Figure 1:
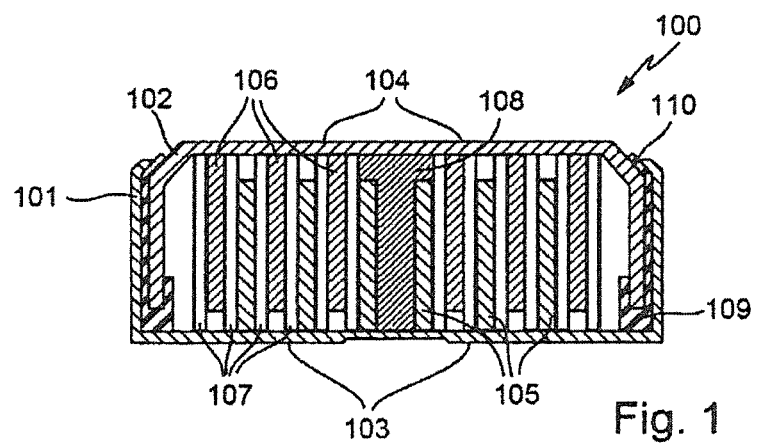
FIG. 1 schematically illustrates the cross section through one preferred example of a button cell.

Our button cell comprises two metallic housing half-parts separated from one another by an electrically insulating seal and form a housing with a flat bottom area and a flat top area parallel to it. As already mentioned initially, the two housing half-parts are generally a so-called "housing cup" and a "housing top." In particular, parts composed of nickel-plated steel or metal sheet are preferred as housing half-parts. Furthermore, trimetals, for example, with the sequence of nickel, steel (or stainless steel) and copper (with the nickel layer preferably forming the outer layer and the copper layer preferably forming the inside of the button cell housing) are particularly suitable for use as the metallic material.

By way of example, an injection-molded or film seal can be used as a seal. The latter are described, for example, in DE 196 47 593.

Within the housing, a button cell comprises an electric-separator assembly with at least one positive and at least one negative electrode. These are each in the form of flat electrode layers. The electrodes are connected to one another via a flat separator. The electrodes are preferably laminated or adhesively bonded onto this separator. The electrodes and the separator generally each have thicknesses only in the μm range. In general, a porous plastic film is used as the separator.

In contrast to the button cells mentioned initially, our button cell is distinguished in particular by the electrode layers having a very particular orientation, specifically being aligned essentially at right angles to the flat bottom and top areas. While button cells known from the prior art with stacked electrode-separator assemblies always contain these assemblies inserted flat such that the electrode layers are aligned essentially parallel to the flat bottom and top areas, the situation in our button cell is the opposite of this.

The right-angled alignment of the electrode layers has an unexpectedly considerable advantage, specifically because it has been found that this alignment results in a considerable improvement in the sealing characteristics of our button cell, particularly for button cells based on lithium-ion systems. The electrodes of rechargeable lithium-ion systems are continually subject to volume changes during charging and discharging processes. Volume changes such as these also occur, of course, in the electrodes of our button cell. However, the mechanical forces which are created during this process no longer act primarily axially, as in the case of a stack of electrode-separator assemblies which are inserted flat. Because of the right-angled alignment of the electrodes, they in fact act radially. Radial forces can be absorbed very much better than axial forces by the housing of a button cell. The improved sealing characteristics are presumably a result of this.

Particularly preferably, the electrodes and the flat separator of our button cell are each in the form of strips or ribbons. By way of example, the production of our button cell can be based on a separator material in the form of an endless ribbon, onto which the electrodes are applied, in particular laminated, once again in particular in the form of strips or at least rectangles.

In the housing of our button cell, this assembly is particularly preferably in the form of a winding, in particular in the form of a spiral winding. Windings such as these can be produced very easily using known methods (see, for example, DE 36 38 793), by applying the electrodes flat, in particular in the form of strips, to a separator which is in the form of an endless ribbon, in particular by laminating them on. In this case, the assembly comprising electrodes and separators is generally wound onto a so-called "winding mandrel." Once the winding has been removed from the winding mandrel an axial cavity remains in the center of the winding. This allows the winding to expand into this cavity, if necessary. However, in some circumstances, this can lead to problems in making electrical contact between the electrodes and the metallic housing half-parts, and this will be described in more detail in the following text.

The electrode winding is preferably arranged within a button cell (so that the electrode layers of the winding are aligned at right angles to the flat bottom area and top area of the housing) such that the end faces of the winding face in the direction of the flat bottom area and of the flat top area.

Preferably, our button cells have a fixed winding core in the center of the winding, which at least partially fills the axial cavity in the center of the winding. A winding core such as this fixes the electrode winding in the radial direction and prevents possible implosion of the winding into the axial cavity. When the winding expands in this way, this also results in the reduction in the pressure which the end faces of the winding exert in the axial direction, and therefore in the direction of output conductors which may be arranged there (this is described in more detail further below). If this is prevented, then there are generally also no problems with making electrical contact between the electrodes and the metallic housing half-parts.

In addition, a winding core such as this also makes the button cell more robust against external mechanical influences. In general, it is no longer possible for the electrode winding in the button cell to be damaged by external mechanical pressure in the axial direction.

Preferably, the electrode winding is a spiral electrode winding, the axial cavity which has been mentioned in the center of the winding is preferably essentially cylindrical (in particular circular-cylindrical). On the casing side, it is bounded by the winding, and at the end it is bounded by corresponding surfaces of the bottom area and of the top area of the button cell housing.

Correspondingly, the winding core which is contained in our button cell is preferably also in the form of a cylinder, in particular a hollow cylinder. The height of a cylinder such as this preferably corresponds to the respective distance between the flat bottom area and the flat top area, which is parallel to it.

Particularly preferably, the winding core may have radially self-expanding characteristics. For example, it is possible for the winding core to be inserted in a radially compressed configuration into the axial cavity in the winding of a button cell. When the radially compressed winding core expands, it exerts a radial pressure on the electrode winding surrounding it, thus ensuring a contact pressure in the axial direction as well.

By way of example, an axially slotted hollow cylinder may be used as a radially self-expanding winding core. However, alternatively, it is also conceivable to use other radially self-expanding materials, for example, based on plastic.

Particularly preferably, the winding core is composed of a metal such as stainless steel or plastic.

Particularly preferably, the assembly comprising electrodes and a separator in our button cell has one of the following layer sequences:

negative electrode/separator/positive electrode/separator
or
positive electrode/separator/negative electrode/separator.

Assemblies such as these can be produced and wound very easily without short circuits occurring between electrodes of opposite polarity.

The separators which can be used in our button cell are preferably films composed of at least one plastic, in particular of at least one polyolefin. By way of example, the at least one polyolefin may be polyethylene. However, it is also possible to use multilayer separators, for example, separators composed of a sequence of different polyolefin layers, for example, with the sequence polyethylene/polypropylene/polyethylene.

It is not essential to use a plurality of separate separators to produce assemblies with the abovementioned sequence. In fact, a separator can also be looped around the end of one of the electrodes, thus resulting in both sides of this electrode being covered by the separator.

The separators which can preferably be used in our button cell preferably have a thickness of between 3 μm and 100 μm, in particular of between 10 μm and 50 μm.

The electrodes preferably have a thickness of between 10 μm and 1000 μm, in particular of between 30 μm and 500 μm.

Preferably, the negative electrode and the positive electrode in the electrode-separator assembly are arranged offset with respect to one another within the assembly. In this case, an offset arrangement is intended to mean that the electrodes are arranged such that this results in a respectively different separation between the electrodes and the flat bottom and top areas in the button cell. In the simplest case, for example, a positive and a negative electrode can be slightly offset as strips of the same width applied to the opposite sides of a separator ribbon, as a result of which the distance between the positive electrode and the upper separator edge is greater than the comparable distance measured from the negative electrode. This then applies in the opposite sense, of course, to the distance from the lower separator edge.

Particularly preferably, preferably as a result of this offset arrangement, the positive electrode, in particular an edge of the positive electrode, rests directly on the cup part, in particular in the flat bottom area of the cup part, while the negative electrode, in particular an edge of the negative electrode, rests directly on the top part, in particular in the flat top area of the top part. In this example, a direct electrical and mechanical contact is made between the electrodes and the cup and top parts. The offset arrangement of the electrodes with respect to one another therefore makes it possible for the electrodes to make contact with the respective housing parts, without any need to use additional electrical contacts and connecting means.

However, alternatively, it is also preferable for at least one of the electrodes, preferably both the at least one negative electrode and the at least one positive electrode in our button cell, to be connected to the flat bottom and top areas via one or more output conductors. By way of example, the output conductors may be output-conductor lugs composed of copper or some other suitable metal. On the electrode side, the output conductors may, for example, be connected to a current collector. The output conductors can be connected to the housing and/or to the current collectors by, for example, welding or via an clamped joint.

In the simplest case, the current collectors of the positive and negative electrodes can also themselves act as output conductors. Collectors such as these are generally metallic films or meshes which are embedded in the respective electrode material. Uncovered subareas, in particular end pieces, of collectors such as these can be bent around and can be brought into contact with the button cell housing.

The use of output conductors may be particularly advantageous if the negative electrode and the positive electrode within the assembly are arranged with respect to one another such that this results in the electrodes each being at the same distance from the flat bottom and top areas. Or, in other words, if the electrodes are not arranged offset with respect to one another within the electrode-separator assembly, as has been described above.

However, if the distance between electrodes of opposite polarity and the flat bottom and top areas is the same, this results in the risk of a positive and a negative electrode touching the metallic cup or top part at the same time, thus resulting in a short circuit. Preferably, the button cell may therefore comprise at least one insulating means, which prevents a direct mechanical and electrical contact between the end faces of the winding and the flat bottom and top areas.

In one development, it is preferable for the electrodes in our button cell such as this to be connected via the already mentioned separate output conductors to the flat bottom and top areas. These ensure the electrical contact between the electrodes and the housing.

In this case, it is preferable for at least a subsection of the output conductor or conductors in the bottom area and in the top area of the housing to rest flat on the inside of the housing half-parts. Ideally, the output conductors naturally make electrical contact with the insides of the housing when they are at least slightly pressed against the housing (if they are not welded to it in any case). This can be achieved surprisingly efficiently by a suitable arrangement of the winding core that has been mentioned, in our button cell.

By way of example, the insulating means may be a flat layer composed of plastic, for example, a plastic film, which is arranged between the end faces of the winding and the flat bottom and top areas of the housing of our button cell.

Corresponding to the above statements, the button cell is, in particular, a rechargeable button cell. Our button cell particularly preferably has at least one lithium-intercalating electrode.

The ratio of the height to the diameter of button cells is, by definition, less than 1. For our button cell, this ratio is particularly preferably between 0.1 and 0.9, in particular between 0.15 and 0.7. In this case, the height means the distance between the flat bottom area and the flat top area parallel to it. The diameter means the maximum distance between two points on the casing area of the button cell.

The button cell is particularly preferably a button cell which is not beaded over, as is described in DE Patent Application 10 2009 017 514.8, mentioned above. Correspondingly, there is preferably an exclusively force-fitting connection between the housing half-parts. Therefore, our button cell does not have a beaded-over cup edge, as is always the case with known button cells. The button cell is closed without being beaded over.

Button cells such as these which are not beaded over generally make use of conventional cell cups and cell tops, which each have a bottom area and a top area, a casing area, an edge area which is arranged between the bottom and top areas and the casing area, and a cut edge. Together, the cell cup and cell top form a housing, which forms a receptacle for the conventional internal components of a button cell such as electrodes, separator and the like. As in the normal way, the bottom area of the cell cup and the top area of the cell top are aligned essentially parallel to one another in this housing. The casing areas of the cell cup and cell top in the finished button cell are aligned essentially at right angles to the bottom and top areas, and preferably have an essentially cylindrical geometry. The internal and external radii of the cell cup and cell top are preferably essentially constant in the casing areas. The edge areas, which have been mentioned, of the cell cup and cell top form the transition between the casing areas and the top and bottom areas. They are preferably therefore bounded on the one hand by essentially flat bottom and top areas, and on the other hand by the essentially cylindrical casing areas, which are arranged at right angles to them. By way of example, the edge areas may be in the form of a sharp edge, or else may be rounded.

The procedure for producing a button cell which is not beaded over is generally to first of all apply a seal to the casing area of a cell top. In a further step, the cell top is then inserted, with the seal fitted, into a cell cup thus resulting in an area in which the casing areas of the cell cup and cell top overlap. The size of the overlap area and the ratio of the overlapping area to the non-overlapping areas are in this case governed by the respective height of the casing areas of the cell cup and cell top, and by the depth of the insertion. With regard to the casing area of the cell top, it is preferable for between 20% and 99%, in particular between 30% and 99%, particularly preferably between 50% and 99%, to overlap the casing area of the cell cup (the percentages each relate to the height of the casing or of the casing area). Before being inserted into the housing cup and/or the housing top, the other conventional components of a button cell (electrodes, separator, electrolyte and the like) are inserted. After the cell top has been inserted completely into the cell cup a pressure is exerted on the casing area of the cell cup, in particular in the area of the cut edge, to seal the housing. In this case, a joined-together housing part should as far as possible not be subjected to any loads, or only to very small loads, in the axial direction. Therefore, the pressure is applied in particular radially. Apart from the sealing of the housing which has already been mentioned the external diameter of the cell housing can therefore also be calibrated.

It is particularly important for the heights of the casing areas of the cell cup and cell top to be matched to one another such that the cut edge of the cell cup is pressed against the casing area of the cell top by the pressure on the casing area of the cell cup. The heights of the casing areas are therefore preferably chosen such that it is impossible to bend the cut edge of the cell cup around inward over the edge area of the cell top which has been completely inserted into the cell cup. Correspondingly, the edge of the cell cup is not beaded over the edge area of the cell top. In consequence, the cell cup of a button cell manufactured using our method has a casing area with an essentially constant radius in the direction of the cut edge.

In the case of button cells produced using a method such as this, there is preferably an exclusively force-fitting connection between the housing components comprising the cell cup, the cell top and the seal. This ensures that the components are therefore held together in a preferred manner, essentially only by static-friction force.

Button cells without any beading over are particularly preferably produced using a cell cup which is conical at least in one subarea of its casing, such that at least its internal diameter increases in the direction of the cut edge. This makes it considerably easier to insert the cell top into the cell cup. The dimensions of the cell cup and cell top are preferably matched to one another such that relatively large opposing forces preferably do not occur until the top has been inserted virtually completely into the cup. The cone angle in this case is preferably between 10 minutes and 3°, in particular between 30 minutes and 1° 30 minutes.

The cell top, which is inserted into the cell cup with the applied seal, is preferably cylindrical, at least in a part of the casing area. This may relate in particular to that part of the casing area which overlaps the conical subarea of the cell cup casing that has been mentioned, after the cell top has been inserted into the cell cup. The casing of the cell top, and therefore also the casing area, is particularly preferably entirely cylindrical. The cell top therefore preferably has a constant external radius in the casing area. This may relate in particular to that part which overlaps the conical part of the casing area of the cell cup after the cell top has been inserted.

When a cell top with a cylindrical casing area is being inserted into a cell cup which is conical at least in one subarea of its casing, as has been described above, a gap which is open at the top is generally created between the cell cup and the cell top. This gap is generally closed again by the pressure on the casing area of the cell cup. Thus, the pressure on the casing area of the cell cup may be chosen such that the conical part of the casing area of the cell cup is pushed inward until the inside of the cell cup and the outside of the cell top are essentially at the same distance from one another in the overlapping area. The resultant button cell has casing areas which are aligned parallel to one another, in particular in the overlapping area.

One important aspect in this case is the choice of the seal which connects the cell cup to the cell top. The seal is preferably a plastic seal which connects the cell cup to the cell top. The seal is preferably a plastic seal composed of a thermoplastic.

The plastic seal is particularly preferably a film seal, for example, as is described in already cited DE 196 47 593, in particular a film seal composed of a thermoplastic.

Film seals can be produced with a very uniform thickness. When a suitable pressure is applied to the casing area of the cell cup, this results in an interference fit, as a consequence of which the button cell that has been produced has highly excellent sealing characteristics. The use of film seals makes it possible to dispense with the edge of the cell cup being beaded over without this on the other hand resulting in a need to accept disadvantages in other important characteristics.

It is very particularly preferable to use plastic seals, in particular plastic films, based on polyamide or based on polyether ether ketones in the present case.

It is preferable for the seal for a cell which is not beaded over to have an initial thickness in the range between 50 µm and 250 µm, particularly preferably between 70 µm and 150 µm, in particular about 100 µm. The term "initial thickness" is in this case intended to mean the thickness of the seal before it is applied to the casing of the cell top. In contrast to this, the term "final thickness" is intended to mean the thickness of the seal in the finished cell. It is clear that, at least in the overlapping area, this generally corresponds to the distance between the inside of the cell cup and the outside of the cell top.

To allow a sufficiently large amount of friction to be produced between the cell cup and the cell top, both the external and internal radii of the cup and top should be matched to one another and to the thickness of the film seal. This is the only way to create a sufficiently high contact pressure to hold the two individual parts together. It is preferable for the parts used in this case for the difference between the external radius of the cell top, which is to be inserted into the cell cup, on the cut edge of the cell top and the smallest internal radius of the cell cup in that part of the casing area which overlaps the casing area of the cell top to be less than the initial thickness of the seal that is used. The difference is particularly preferably between 10% and 90% of the initial thickness, in particular between 30% and 70%, and very particularly preferably about 50%.

After the cell top has been inserted into the cell cup, a part of the casing area of the cell cup can be drawn radially inward. In particular, this relates to that part of the casing area which does not overlap the casing area of the cell top.

It has been found that this process of drawing in radially makes it possible to achieve considerably better sealing characteristics. Drawing in the cup casing results in a radial pressure being exerted on the edge section which rests on the inner wall of the housing cup and on the seal which is arranged between the housing top and the housing cup, with the seal in consequence being compressed in this area.

The drawing-in process can be carried out at the same time as the already mentioned exertion of pressure on the casing area of the cell cup, although the drawing-in process is preferably carried out in a subsequent, separate step.

Our method of producing a button cell can be used in particular to produce button cells as have been described above, that is to say button cells having a housing with a flat bottom area and a flat top area parallel to it. It is suitable for producing not only button cells which are not beaded over, but also for those which are beaded over.

With respect to the preferred examples of the individual components which are used in our method (housing parts and dimensions, electrodes, separator and the like), reference can therefore be made to the above statements and explanations in their entirety.

In general, the housing is assembled from a metallic cup part (housing cup) and a metallic top part (housing top), with an electrode-separator assembly with electrodes in the form of a flat layer being inserted into the housing such that the electrodes are aligned at right angles to the flat bottom area and top area.

As already mentioned, the electrode-separator assembly is preferably installed in the form of a winding, in particular a spiral winding.

In general, our method always comprises the following steps:

insertion of the winding into the metallic top part, and
insertion of the metallic top part with the winding into a metallic cup part.

The edge of the cup part is then optionally beaded over the edge of the top part.

When a button cell which is not beaded over is produced, the corresponding steps as described above are carried out.

Before the housing is closed, the electrodes are normally also impregnated with electrolyte solution.

For the insertion process, the winding is preferably rolled up on a winding mandrel. After or during the insertion process, the winding mandrel can then be removed. If required, the winding core that has been mentioned above is then inserted. Alternatively, the electrode-separator assembly can also be wound directly onto a core such as this.

The spiral winding is particularly preferably heat-treated on its end faces before being installed. In this case, it is at least briefly subjected to a temperature at which the separator in the winding is thermoplastically deformable. In general, the separator projects somewhat on the end faces of the winding, and this is itself subject to the precondition that the electrodes are arranged with the offset with respect to one another, as described above. The heat treatment allows the separator to be shrunk together somewhat, therefore, if required, even exposing the edge of an adjacent electrode, such that this can rest directly on the button cell housing.

The stated advantages and further advantages will become evident from the description which now follows of the drawings. In this case, individual features may be implemented on their own or in combination with one another. The described examples are intended only for explanation and better understanding, and should in no way be understood as being restrictive.

FIG. 1 schematically illustrates the cross section through one preferred example of a button cell 100. This has a metallic cup part 101 and metallic top part 102. The two parts are connected to one another, sealed by a seal 109. Together, they form a housing with a flat bottom area 103 and a flat top area 104 parallel to it. When in use, these flat areas 103 and 104 form the poles of the button cell, from which current can be drawn by a load. The edge 110 of the cell cup 101 is beaded inward over the edge of the cell top 102.

An arrangement comprising an electrode 105 in the form of a strip, an electrode 106 in the form of a strip, and the separators 107 in the form of strips is arranged in the interior of the electrode. The assembly comprising the electrodes 105 and 106 as well as the separators 107 is in this case in the form of a winding, whose end faces abut against the flat bottom area 103 and the flat top area 104, which is parallel to it. The assembly is wound up on the core 108 in the center of the button cell 100. Both the core 108 as well as the electrodes and separators which are wound around it are aligned at right angles to the flat bottom and top areas 104 and 103. When the volume of the electrodes increases or decreases during a charging or discharging process, the mechanical forces which result in this case act predominantly radially, and can be absorbed by the casing area of the button cell 100.

It should be stressed that the positive electrode 105 and the negative electrode 106 respectively rest directly on the cup part 101 and on the top part 102 of the button cell 100. There is no need for a separate output conductor for connecting the electrodes to the top part 102 and to the cup part 101.

Figure 2:
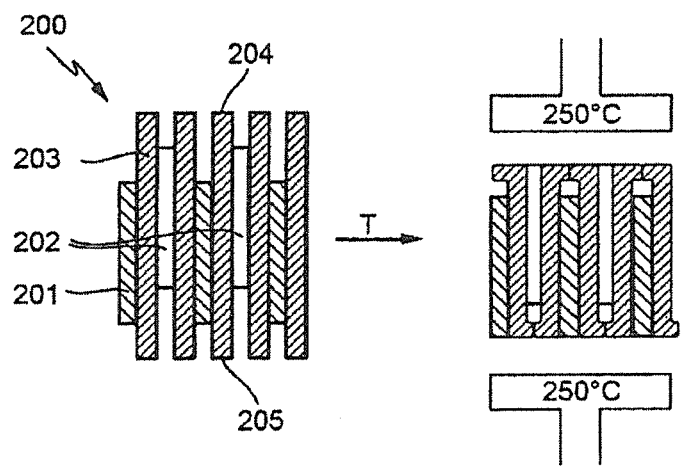
FIG. 2 illustrates the effect of heat treatment of a wound-up electrode-separator assembly, which is used in preferred examples of our method.

FIG. 2 shows the effect of the heat treatment of an electrode-separator winding 200, which is provided in preferred examples of the method of producing a button cell. The illustration schematically shows a winding 200 comprising an assembly of a positive electrode 201 (bar with cross strips), a negative electrode 202 (white bar) and the separators 203 (detail). The positive and the negative electrodes 201 and 202 are in each case arranged offset with respect to one another. The separators 203 are composed of a thermoplastically deformable material.

When the separator edges which are located on the end faces 204 and 205 of the winding 200 are subjected to a high temperature (for example, of 250° C., as illustrated), then these separator edges shrink. The separators are drawn in at least partially between adjacent electrodes. In the process, the edges of the negative electrode 202 are exposed on the end face 204, while the edges of the positive electrode 201 are covered. The edges of the positive electrode 201 on the end face 205 are exposed, while the edges of the negative electrode 202 are covered.

When a winding that has been treated in this way is in use, this ensures that electrodes of the same polarity can each rest directly only on the housing cup or on the housing top. There is no need for separate electrical connections between the electrodes and the housing parts.

Figure 3A:
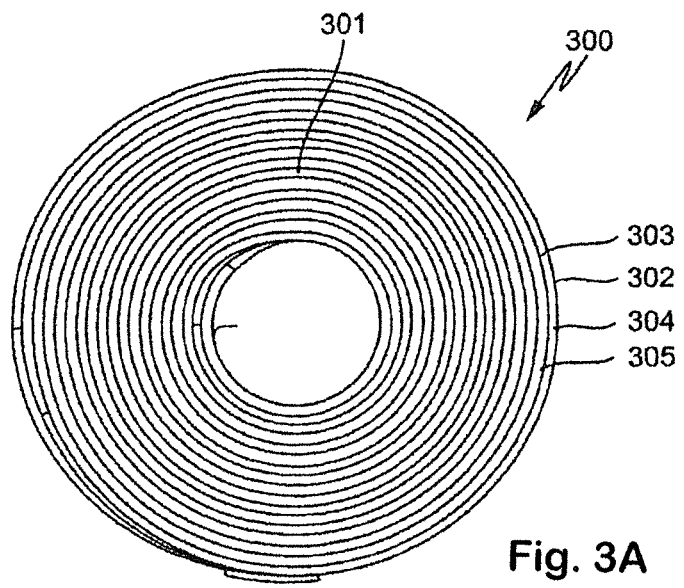
FIGS. 3A and 3B show an electrode-separator assembly in the form of a winding, as can be installed in a button cell.
Figure 3B:
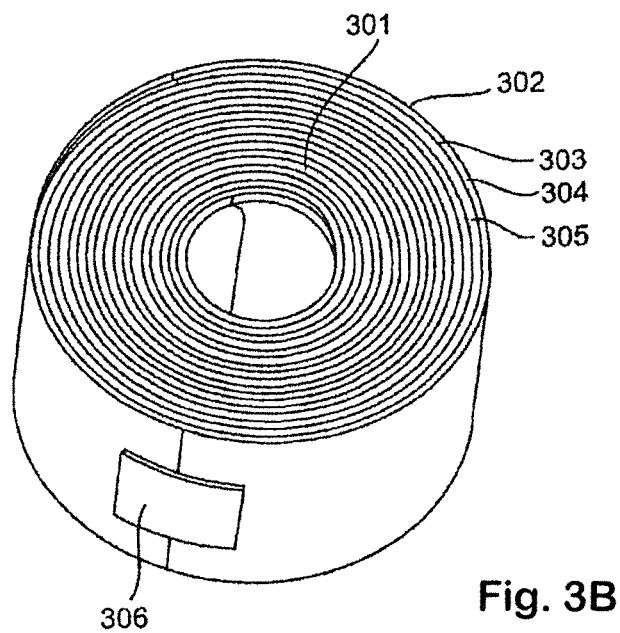

FIGS. 3A and 3B show an electrode-separator assembly for button cells in the form of a winding 300, with the illustration A depicting a plan view vertically from above at one of the end faces 301 of the winding 300, while the illustration B shows the winding 300 in a view obliquely from above. In both cases, this shows that the assembly comprises two layers; separators 302 and 303 as well as two electrode layers 304 and 305 (a positive and a negative electrode). The assembly is wound up in a spiral shape and is held together by an adhesive tape 306 on its outside.

Figure 4:
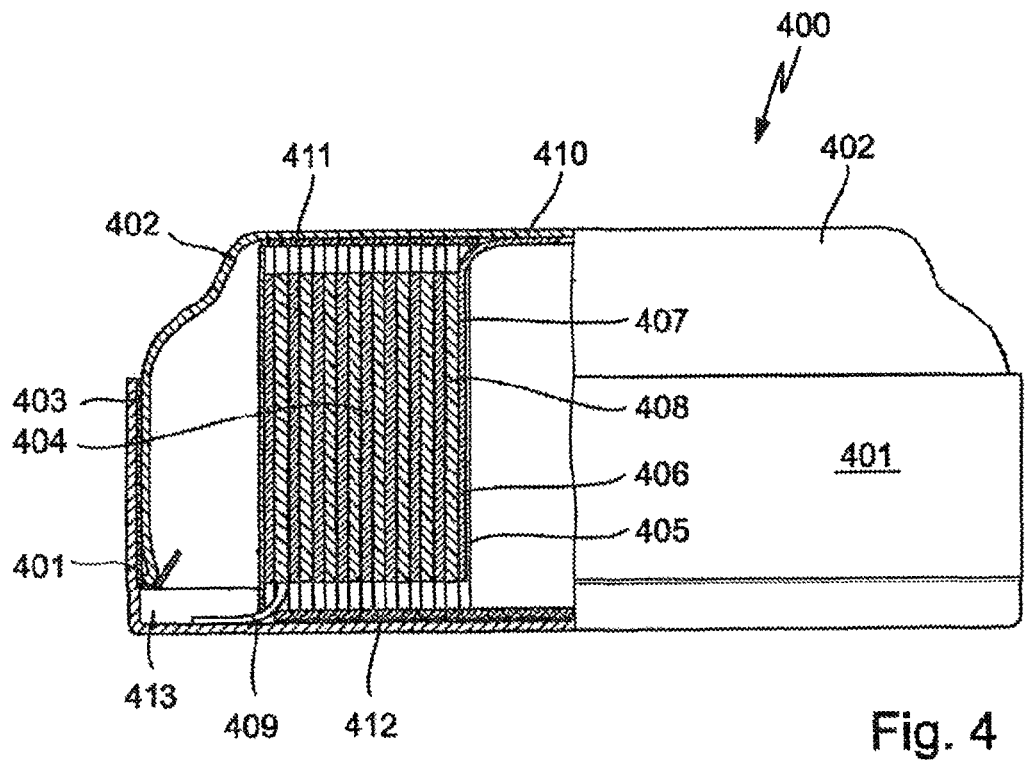
FIG. 4 shows a section illustration of a further preferred example of a button cell.

FIG. 4 shows a sectioned illustration of one preferred example of a button cell 400. The figure shows the housing of the button cell comprising the cup part 401 and the top part 402, between which the seal 403 is arranged. An assembly of electrodes and separators, as is illustrated in FIGS. 3A and 3B, is contained as a spiral winding 404 (illustrated schematically in the cross section) within the housing. The separator layers 405 and 406 as well as the electrodes 407 and 408 of opposite polarity can also be seen well here. In this case, the electrode 407 is connected via the output conductor 410 to the top part 402, while the electrode 408 is connected via the output conductor 409 to the cup part 402. The output conductor 410 is preferably welded to the top part 402. In contrast, the output conductor 409 is connected to the cup part 402 via a clamping connection (it is clamped inbetween the supporting ring 413, on which the edge of the cell top rests, and the bottom of the cell cup). The insulating means 411 and 412 are arranged between the end faces of the winding and the cup part 401 and the top part 402, and are each in the form of thin plastic disks. This prevents electrodes of opposite polarity from being able to come into contact with the cup part 401 or the top part 402 at the same time. This prevents any short circuit.

Figure 5:
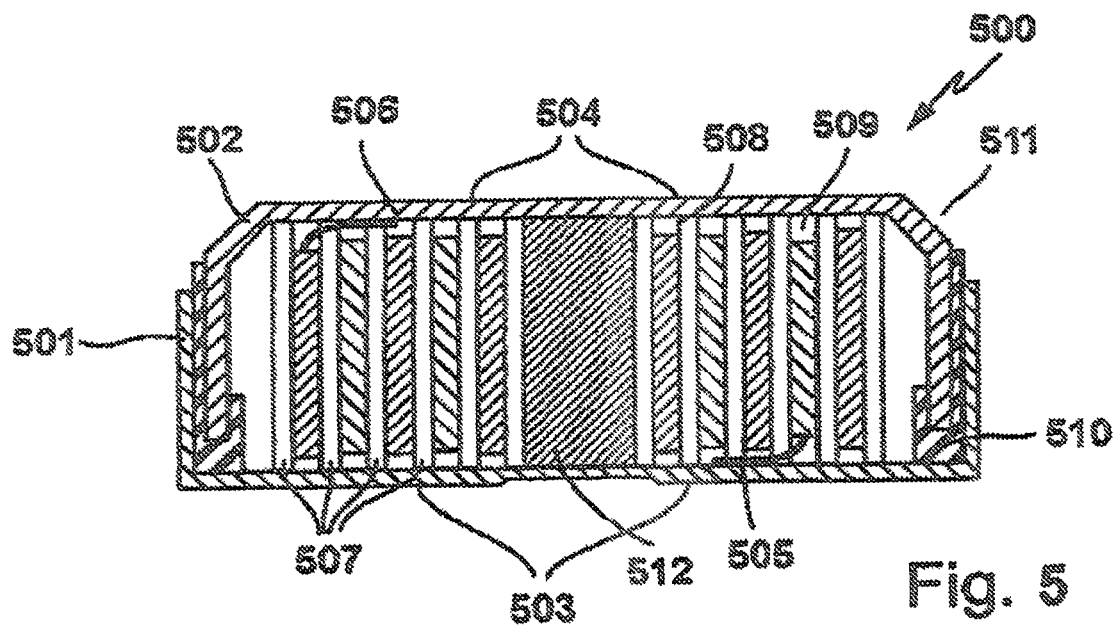
FIG. 5 schematically illustrates the cross section through one preferred example of a button cell in which the edge of the cell cup is not beaded over the edge of the cell cop.

FIG. 5 schematically illustrates the cross section through one preferred example of a button cell 500.

This button cell 500 has a metallic cup part 501 and a metallic top part 502. The two parts are connected to one another, sealed by a seal 510. Together, they form a housing with a flat bottom area 503 and a flat top area 504 parallel to it. When in use, these flat areas 503 and 504 form the poles of the button cell, from which current can be drawn by a load.

The cell top 502 is inserted into the cell cup 501 such that the casing areas of the cell top and of the cell cup overlap, with the internal radius of the cell cup 501 in the overlapping area being essentially constant in the direction of the cut edge. Therefore, the edge of the cell cup 501 is not beaded over the edge 511 of the cell top 502, and the preferred example described above for a button cell 500 is therefore a button cell which is not beaded over.

An assembly comprising an electrode 508 in the form of a strip, an electrode 509 in the form of a strip and separators 507 in the form of strips is arranged in the interior of the electrode. The assembly comprising the electrodes 508 and 509 as well as the separators 507 is in this case in the form of a winding, whose end faces face in the direction of the flat bottom area 503 and of the flat top area 504 which is parallel to it. The assembly is wound up on the winding core 512 in the center of the button cell 500. Both the core 512 and the electrodes and separators which are wound around it are aligned at right angles to the flat bottom and top areas 504 and 503. If the volume of the electrodes increases or decreases during a charging or discharging process, the mechanical forces which result in this case act predominantly radially, and can be absorbed by the casing area of the button cell 500.

The positive and the negative electrodes make contact with the housing half-part comprising the cup and top via the output conductor 505 and the output conductor 506. The output conductor 505 is composed of aluminum, and the output conductor 506 is composed of nickel (or alternatively of copper). Both output conductors are thin films, which rest flat between the end faces of the winding and the flat top and bottom areas 503 and 504. A continuous slight contact pressure is maintained on the output conductors by the winding core 512. The output conductors are preferably separated from the end faces of the winding by a separate insulator arrangement (not illustrated in the drawing), for example, by a thin film.

The invention claimed is:

1. A button cell comprising:
   a housing cup and a housing top separated from one another by an electrically insulating seal and which form a housing with a flat bottom area and a flat top area parallel to it, and
   an electrode-separator assembly within the housing comprising at least one positive and at least one negative electrode in the form of flat layers and connected to one another by at least one flat separator,
   wherein
   the electrode layers are aligned essentially at right angles to the flat bottom area and the flat top area and the electrode-separator assembly is a spiral winding having end faces defining side surfaces of the spiral winding facing in an axial direction relative to the flat bottom area and the flat top area, and
   one of the electrodes connects to the flat bottom area or the flat top area via an output conductor comprising a foil resting flat between an end face of the spiral winding and the flat top or the flat bottom area to which it is connected.

2. The button cell as claimed in claim 1, wherein the electrodes and/or the separator are/is strips or ribbons.

3. The button cell as claimed in claim 1, wherein the winding has an axial cavity in its center, which axial cavity is at least partially filled by a winding core.

4. The button cell as claimed in claim 1, wherein the electrode-separator assembly has one of the following layer sequences:
   negative electrode/separator/positive electrode/separator and
   positive electrode/separator/negative electrode/separator.

5. The button cell as claimed in claim 1, wherein the positive electrode and/or the negative electrode connect via the output conductor to the housing in an area of the flat bottom area and/or of the flat top area.

6. The button cell as claim in claim 1, further comprising at least one insulator which prevents direct mechanical and electrical contact between the end faces of the winding and the flat bottom and top areas.

7. The button cell as claimed in claim 6, wherein the at least one insulator is a flat layer composed of plastic arranged between the end faces of the winding and the flat bottom and top areas.

8. The button cell as claimed in claim 1, which is rechargeable.

9. The button cell as claimed in claim 1, having a height:diameter ratio of <1.

10. A method of producing a button cell according to claim 1, comprising inserting an electrode-separator assembly with flat layer electrodes into the housing such that the flat layers of the electrode are aligned essentially at right angles to the flat bottom and top areas, wherein the housing comprises a metallic cup part and a metallic top part.

11. The method as claimed in claim 10, wherein the electrode-separator assembly is inserted as a winding.

12. The method as claim in claim 11, further comprising:
    inserting the winding into the metallic top part, and
    inserting the metallic top part with the winding into a metallic cup part.

13. The method as claimed in claim 11, wherein the winding is heat-treated on its end faces before being installed, and subjected to a temperature at which the separator is thermoplastically deformable.

* * * * *

(12) INTER PARTES REVIEW CERTIFICATE (2689th)

United States Patent
Pytlik et al.

(10) Number: US 9,496,581 K1
(45) Certificate Issued: Apr. 11, 2022

(54) BUTTON CELLS AND METHOD OF PRODUCING SAME

(71) Applicants: Eduard Pytlik; Jürgen Lindner; Ulrich Barenthin; Winfried Gaugler

(72) Inventors: Eduard Pytlik; Jürgen Lindner; Ulrich Barenthin; Winfried Gaugler

(73) Assignee: VARTA MICROBATTERY GMBH

Trial Number:

IPR2020-01211 filed Jul. 7, 2020

Inter Partes Review Certificate for:

Patent No.: 9,496,581
Issued: Nov. 15, 2016
Appl. No.: 14/827,387
Filed: Aug. 17, 2015

The results of IPR2020-01211 are reflected in this inter partes review certificate under 35 U.S.C. 318(b).

INTER PARTES REVIEW CERTIFICATE
U.S. Patent 9,496,581 K1
Trial No. IPR2020-01211
Certificate Issued Apr. 11, 2022

AS A RESULT OF THE INTER PARTES REVIEW PROCEEDING, IT HAS BEEN DETERMINED THAT:

Claims 1-12 are cancelled.

14. (substitute for claim 1) *A button cell comprising:*
a housing cup including a flat bottom area and a cup casing extending along an axial direction and a housing top including a flat top area and a top casing extending along the axial direction, the housing cup and the housing top separated from one another by an electrically insulating seal and which form a button cell housing with the flat top area parallel to it the flat bottom area, and
a rechargeable lithium-ion electrode-separator assembly disposed within the button cell housing comprising at least one positive electrode and at least one negative electrode in the form of flat layers and connected to one another by at least one flat separator,
wherein the electrode layers are aligned essentially at right angles to the flat bottom area and the flat top area, wherein the rechargeable lithium-ion electrode-separator assembly is a spiral winding having end faces defining side surfaces of the spiral winding facing in the axial direction relative to the flat bottom area and the flat top area,
a first of the electrodes connects to a first of the flat bottom area or the flat top area via a metal foil output conductor comprising a flat portion extending in a radial direction perpendicular to the axial direction and resting flat between an a first end face of the spiral winding and the first of the flat bottom area or the flat top area to which the flat portion is connected via a weld,
wherein the cup casing partially overlaps the top casing in an overlapping area, the top casing is disposed radially inward of the cup casing in the overlapping area, and the housing cup and the housing top are held together by a force-fitting connection, and
wherein the cup casing includes a first part proximal to the flat bottom area and a second part disposed in the overlapping area, the first part of the cup casing being disposed radially inward with respect to the second part.

15. (substitute for claim 2) *The button cell as claimed in claim 14, wherein the electrodes and the separator are/is strips or ribbons.*

16. (substitute for claim 3) *The button cell as claimed in claim 14, wherein the winding has an axial cavity in its center, which axial cavity is at least partially filled by a winding core.*

17. (substitute for claim 4) *The button cell as claimed in claim 14, wherein the electrode-separator assembly has one of the following layer sequences:*
negative electrode/separator/positive electrode/separator and
positive electrode/separator/negative electrode/separator.

18. (substitute for claim 5) *The button cell as claimed in claim 14, wherein the first of the electrodes comprises a positive electrode, the metal foil output conductor is a first metal foil output conductor, and a negative electrode of the at least one negative electrode is connected to the housing via a second metal foil output conductor including a flat portion extending in a radial direction perpendicular to the axial direction along a second end face of the spiral winding, and wherein the positive electrode and the negative electrode respectively connect via the first metal foil output conductor and the second metal foil output conductor to the housing in an area of the flat bottom area and of the flat top area, respectively.*

19. (substitute for claim 6) *The button cell as claimed in claim 14, further comprising at least one insulator which prevents direct mechanical and electrical contact between the end faces of the spiral winding and the flat bottom area and the flat top area, respectively.*

20. (substitute for claim 7) *The button cell as claimed in claim 19, wherein the at least one insulator is a respective flat layer composed of plastic film arranged between the end faces of the spiral winding and the flat bottom area and the flat top area, respectively.*

21. (substitute for claim 8) *The button cell as claimed in claim 19, wherein the spiral winding maintains contact pressure on the output conductor in the axial direction.*

22. (substitute for claim 9) *The button cell as claimed in claim 14, having a height:diameter ratio of in a range between 0.15 and 0.7.*

23. (substitute for claim 10) *A method of producing a button cell including a housing cup including a flat bottom area and a cup casing extending along an axial direction and a housing top including a flat top area and a top casing extending along the axial direction, the housing cup and the housing top separated from one another by an electrically insulating seal and which form a button cell housing with the flat top area parallel to the flat bottom area, and a rechargeable lithium-ion electrode-separator assembly disposed within the button cell housing comprising at least one positive electrode and at least one negative electrode in the form of flat layers and connected to one another by at least one flat separator, wherein the electrode layers are aligned essentially at right angles to the flat bottom area and the flat top area, wherein the rechargeable lithium-ion electrode-separator assembly is a spiral winding having end faces defining side surfaces of the spiral winding facing in the axial direction relative to the flat bottom area and the flat top area, a first of the electrodes connects to a first of the flat bottom area or the flat top area via a metal foil output conductor comprising a flat portion extending in a radial direction perpendicular to the axial direction and resting flat between a first end face of the spiral winding and the first of the flat bottom area or the flat top area to which the flat portion is connected via a weld, wherein the cup casing partially overlaps the top casing in an overlapping area, the top casing is disposed radially inward of the cup casing in the overlapping area, and the housing cup and the housing top are held together by a force-fitting connection, and wherein the cup casing includes a first part proximal to the flat bottom area and a second part disposed in the overlap-*

INTER PARTES REVIEW CERTIFICATE
U.S. Patent 9,496,581 K1
Trial No. IPR2020-01211
Certificate Issued Apr. 11, 2022

*ping area, the first part of the cup casing being disposed radially inward with respect to the second part, the method comprising:*

*inserting the electrode-separator assembly into the button cell housing such that the flat layers of the electrode-separator assembly are aligned essentially at right angles to the flat bottom area and the flat top area, wherein the housing cup and the housing top comprise a metallic housing cup and a metallic housing top;*

*inserting the metallic housing top into the metallic housing cup such that the cup casing partially overlaps the top casing in the overlapping area;*

*applying, in a radial direction perpendicular to the axial direction of the electrode-separator assembly winding, a pressure on the metallic housing cup so as to compress the electrically insulating seal and to form the interference fit to seal the button cell housing;*

*forming the first part of the metallic housing cup.*

24. (substitute for claim 11) *The method as claimed in claim 23, wherein the metal foil output conductor is separate from the first of the electrodes, the method further comprising:*

*connecting the metal foil output conductor to the first of the electrodes.*

25. (substitute for claim 12) *The method as claimed in claim 23, further comprising:*

*inserting the spiral winding into the metallic housing top,*

*applying the electrically insulating seal to one of the metallic housing top and the metallic housing cup, and*

*inserting the metallic housing top with the spiral winding into the metallic housing cup such that the electrically insulating seal separates the metallic housing top from the metallic housing cup.*

\* \* \* \* \*